E. M. ELTON.
NUT LOCK.
APPLICATION FILED MAR. 11, 1918.
1,296,174.
Patented Mar. 4, 1919.
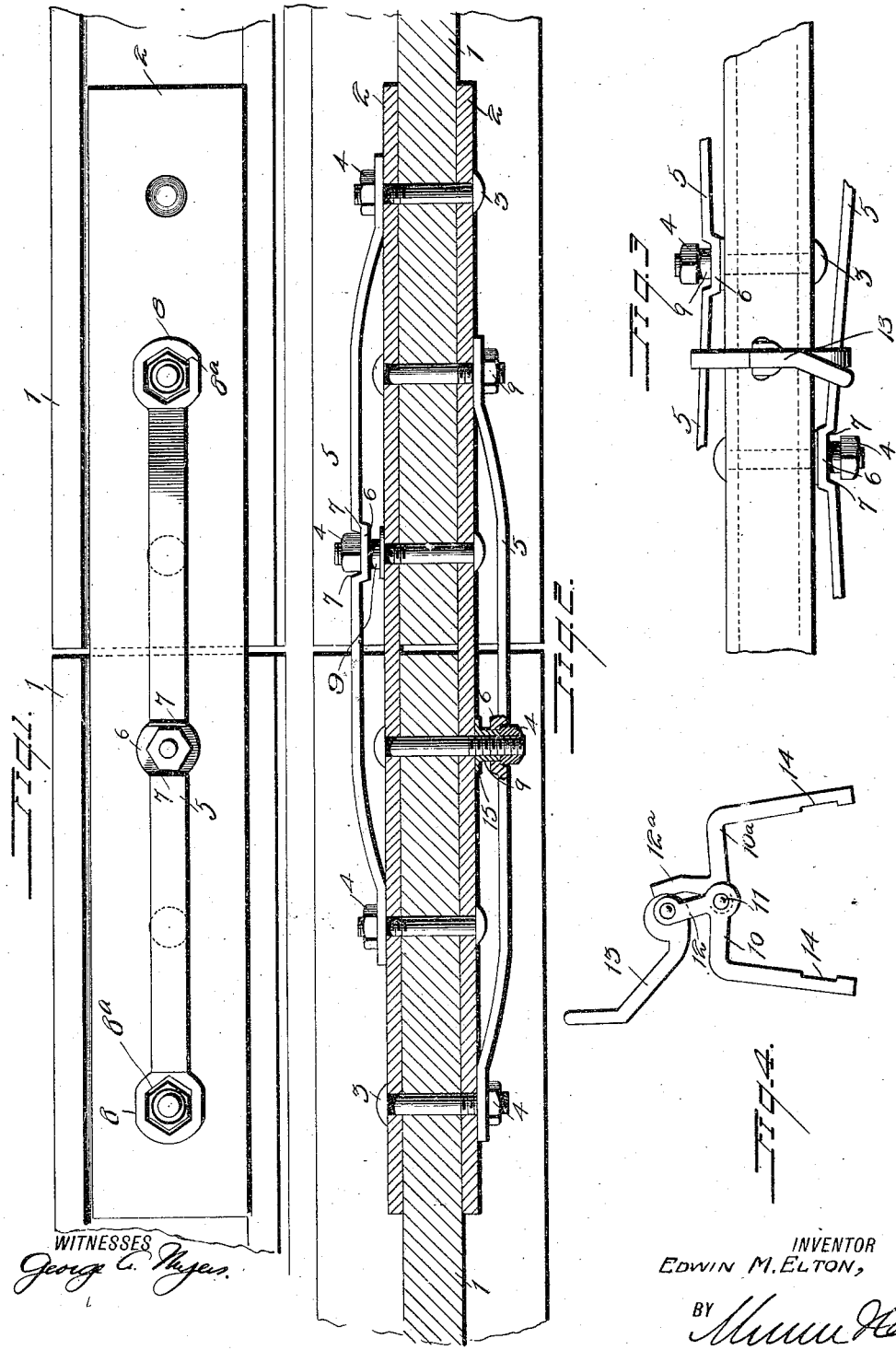
INVENTOR
EDWIN M. ELTON,
BY
ATTORNEYS

UNITED STATES PATENT OFFICE.

EDWIN MERITT ELTON, OF ATWATER, OHIO.

NUT-LOCK.

1,296,174. Specification of Letters Patent. Patented Mar. 4, 1919.

Application filed March 11, 1918. Serial No. 221,724.

*To all whom it may concern:*

Be it known that I, EDWIN MERITT ELTON, a citizen of the United States, and a resident of Atwater, in the county of Portage and State of Ohio, have invented certain new and useful Improvements in Nut-Locks, of which the following is a specification.

My invention is an improvement in nut locks, and has for its object to provide a device of the character specified especially adapted for use in locking nuts on rail joints.

In the drawings:

Figure 1 is a side view of a rail joint in which the improved nut lock is used;

Fig. 2 is a horizontal section on the line of the bolts;

Fig. 3 is a top plan view showing the manner of placing or removing the locks; and Fig. 4 is a front view of the clamp.

The present embodiment of the invention is shown in connection with a rail joint, the rail ends 1 being connected by the usual fish plates 2, bolts 3 and nuts 4. The bolts are passed through registering openings in the fish plates and the webs of the rails in the usual manner, six bolts being used in the present instance, three bolts being passed through from one side and three from the other, and the members of each series of bolts alternate with the members of the other series.

The improved lock comprises a plate 5 of resilient metal, having at its center a laterally offset portion 6, forming between each end of the strip and the laterally offset portion a transverse shoulder 7, and these shoulders are spaced apart to receive a nut 4 and to lock the nut from turning when it is in the laterally offset portion of the lock.

Each end of the plate has a head 8, provided with an opening 8ª shaped to receive a nut, the opening having a hexagonal outline in the present instance. The plate 5 is arched longitudinally, as shown more particularly in Fig. 2, and it is arranged at the joint with its convex side outward, and with the concave side toward the fish plate.

In use, a washer 9 is arranged between the nut 4 of the bolt which engages the laterally offset portion 6 and the fish plate, and the opening through the laterally offset portion which receives the bolt is large enough to also receive the washer. In placing the improved lock, the rails are bolted together, with the exception of placing the nuts of the two bolts at the ends of the rail, that is, the nuts of those bolts nearest the meeting ends of the rails. The plate 5 is then placed with the washer 9 passing through the opening at the laterally offset portion 6, and with the openings 8ª over the nuts at that side of the joint, as shown in Fig. 2. Because of the arch in the plate 5, it is necessary to clamp the same to the rail, during the placing of the nut at the center of the plate, and the clamp shown in Figs. 3 and 4 is utilized for this purpose.

This clamp, as shown, comprises two angle bars 10 and 10ª which are pivoted together at one end, as indicated at 11. Each angle bar has an extension 12 and 12ª, respectively, at the pivotal connection, and a cam lever 13 is pivoted to one of the extensions, the cam of the lever engaging the other extension in such manner that when the lever is thrown to the right of Fig. 4, the substantially parallel portions of the members 10 and 10ª will be forced together. Each of these portions above mentioned is notched, as shown at 14, to engage the plate 5 to prevent slipping of the clamp, and the clamp is arranged as shown in Fig. 3, engaging the two locks at opposite sides of the joint. With the parts in the position of Fig. 4, the clamping members 10 and 10ª are engaged with the locks at opposite sides of the rail, after which the lever is turned over into the position of Fig. 3, thus forcing the laterally offset portions 6 of the two locks toward the fish plates. It will be noticed that each washer 9 has a radial continuous rib 15 at its inner end, which abuts against the fish plate, and the laterally offset portions 6 of the locks are forced downward on to these ribs. The nuts 4 of the bolts adjacent to the meeting ends of the rails are now turned home and the clamp is released. Thus with the two locks all six bolts of the joint are locked from turning, and they cannot become accidentally released. To release the nuts it is necessary to again clamp the locks, to release the nuts 4 of the bolts adjacent to the meeting ends of the rails, after which the plates 5 may be removed, releasing all of the bolts.

While the improved lock is shown in connection with a rail joint, it is obvious that it might be used with equal facility in other situations where a series of nuts is desired to be locked.

I claim:

1. The combination with a rail joint, of locks for locking the ends of the joint, said locks being arranged upon opposite sides of the joint and each lock locking three nuts, each lock comprising a plate having intermediate its ends means for engaging the central nut to prevent rotation thereof and having at each end means for engaging the lateral nuts to prevent turning thereof, said plate being arched longitudinally and arranged with its convex surface outward, said plate having at the central locking means an opening for the bolt, and a washer rotatable in the opening for engaging the bolt to space the central nut from the rail.

2. The combination with a rail joint, of locks for locking the nuts of the joint, said locks being arranged upon opposite sides of the joint and each lock locking three nuts, each lock comprising a plate having intermediate its ends means for engaging the central nut to prevent rotation thereof and having at each end means for engaging the lateral nuts to prevent turning thereof, said plate being arched longitudinally and arranged with its convex surface outward, said plate having at the central locking means an opening for the bolt, and means at the central nut for spacing the nut from the rail.

EDWIN MERITT ELTON.

Witnesses:
R. C. BEECHLEY,
MARGARET M. BEECHLEY.